United States Patent
Lukey

[11] Patent Number: 5,822,907
[45] Date of Patent: Oct. 20, 1998

[54] DECOY WEIGHT

[76] Inventor: Cordell Lukey, 2283 Hurrican Road R.R. #2, Welland, Ontario, Canada, L3B 5N5

[21] Appl. No.: 603,713

[22] Filed: Feb. 20, 1996

[51] Int. Cl.$^6$ ................................. A01M 31/06
[52] U.S. Cl. ................................................ 43/3
[58] Field of Search ............... 43/2, 3; 294/82.11; 114/293, 294, 215, 213; 441/28

[56] References Cited

U.S. PATENT DOCUMENTS

| | | | |
|---|---|---|---|
| 231,906 | 9/1880 | Gladwish | 43/3 |
| 364,573 | 6/1887 | Brinkop | 43/3 |
| 1,370,145 | 3/1921 | Moore | 43/3 |
| 2,520,233 | 8/1950 | Buehl | 43/3 |
| 2,555,815 | 6/1951 | Rawlins | 43/3 |
| 2,589,913 | 3/1952 | Wenner | 43/3 |
| 2,747,315 | 5/1956 | Clemas | 43/3 |
| 2,813,363 | 11/1957 | Leckner | 43/3 |
| 3,930,328 | 1/1976 | Knuth | 43/3 |
| 4,056,890 | 11/1977 | Dembski | 43/3 |
| 5,168,650 | 12/1992 | Martin | 43/3 |

*Primary Examiner*—Kurt Rowan

[57] ABSTRACT

The present invention relates to a decoy weight assembly consisting of a weight having a hole through its longitudinal axis through which an elastized cord is inserted. The end of the cord at the bottom end of the weight is attached to a hook means. The other end of the cord is connected via a string or other suitable means to the bottom of the decoy. When in use the weight slides down the cord and rests on top of the hook means. The length of cord and size of the weight will vary depending on the size and type of decoys being used. When the decoy is being transported the string and cord are wound around a stabilizing fin provided on the bottom of the decoy and retained in place by the hook means. This invention prevents the tangling of decoy weights and rope associated with prior art systems.

2 Claims, 3 Drawing Sheets

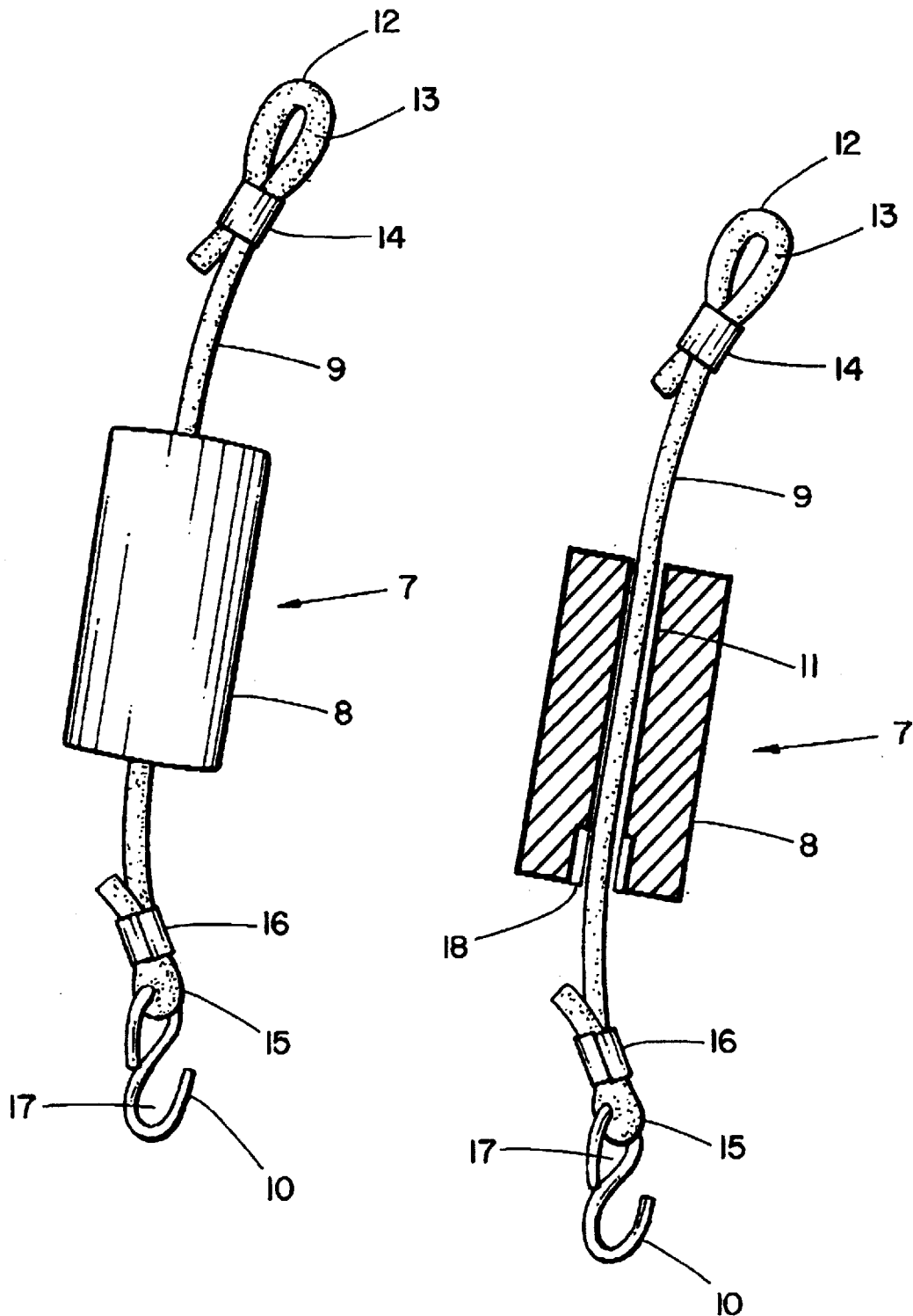

DECOY WEIGHT

BACKGROUND OF THE INVENTION

1. Field of the Invention

This invention relates to hunting equipment and in particular, to duck and goose decoy weights.

2. Description of the Prior Art

It is common when hunting water fowl, such as ducks and geese, to place decoys on the water to encourage ducks and geese flying overhead to land. In order to maintain the stability of the decoys a string with a lead weight at the end is attached to the bottom of the decoy. As an individual hunter may have several decoys the string and weight are typically wrapped around the neck of the decoy several times when traveling to and from the water. The weights often come loose or become entangled. The loose weights rattle against the decoys making a noise that can scare off any ducks and geese and will scratch off the decoy paint. In addition the weights are commonly made of lead. One type of decopy weight consists of a lead rod with a saucer on the bottom. When storing the decoy the lead rod is wrapped around the neck of the decoy. After repeated bending the rod breaks and the hunter throws the weight away creating a potential environmental hazard.

SUMMARY OF THE INVENTION

It is an object of the invention is to provide a decoy weight that is held snug in place and will not come loose or become entangled during transport.

It is a further object of the invention to provide a decoy weight that is not wrapped around head of the decoy at the end of a rope.

It is a further object of the invention to provide a decoy weight that does not rattle or make noise during transport and will not scratch paint off of the decoys.

It is a further object of the invention to provide a decoy weight that assists in providing a real life action to the decoy when in use.

It is a further object of the invention to provide a decoy weight that is environmentally friendly.

Thus, in accordance with the present invention, there is provided a decoy weight assembly consisting of a weight having a hole along is longitudinal axis through which an elasticized cord is inserted. The end of the cord at the bottom end of the weight is attached to a hook means. The other end of the cord is connected to a string attached to the bottom of the decoy. When in use the weight slides down the cord and rests on top of the hook means. The length of cord and size of the weight will vary depending on the size and type of decoys being used. When the decoy is being transported the string and cord are wrapped around a stabilizing fin provided on the bottom of the decoy and the elastized cord stretched to permit the hook means to retain the wounded up string and cord in place. This invention prevents the tangling of decoy weights and rope associated with prior art systems and prevents the weight from coming loose, rattling and/or chipping the paint from the decoy. The weight can be made of environmentally friendly material and will not be destroyed after repeated use and disposed of in the field thereby eliminating a environmental hazard.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIG. 2 is a perspective of the decoy weight of FIG. 1.

FIG. 3 is a plan view partly in cross section of the decoy weight of FIG. 2.

DETAILED DESCRIPTION OF THE PREFERRED EMBODIMENT

Figure 1:
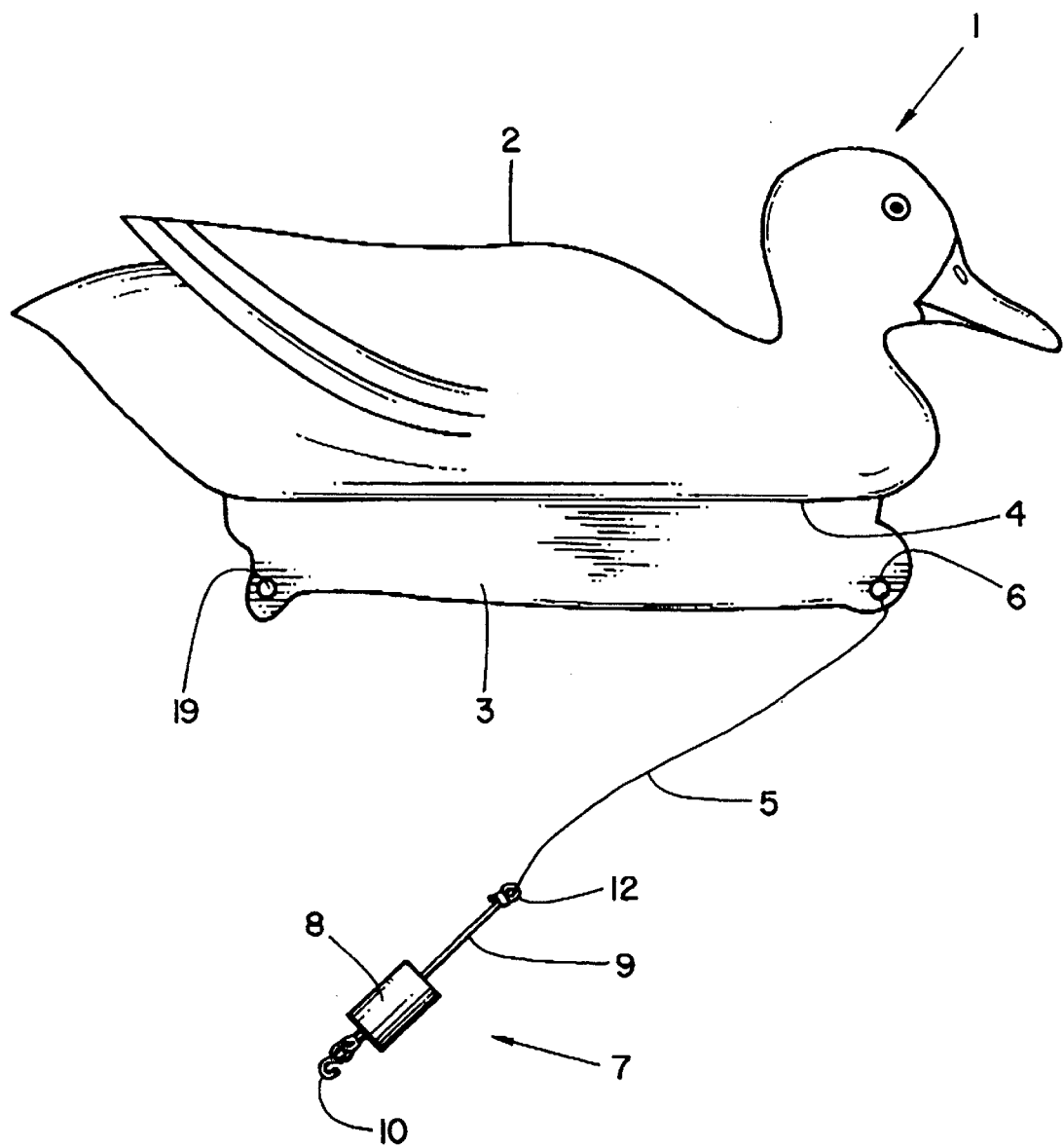
FIG. 1 illustrates a decoy with the weight of the present invention attached to the decoy.

Referring to FIG. 1, a decoy generally indicated at 1 consists of a buoyant duck or goose facsimile 2 and a stabilizing fin 3 depending from the bottom surface 4 of the duck or goose facsimile 2. A decoy weight assembly 7 of the present invention is shown attached to a string 5 connected to stabilizing fin 3 through hole 6.

The decoy weight assembly 7 of the present invention as shown in FIGS. 1 to 4 consists of a weight 8 shown in the preferred embodiment as a piece of cylindrical metal rod, an elastized cord 9 which passes through a hole 11 along the longitudinal axis running the length of weight 8. One end 12 of elastized cord 9 is connected to string 5 by any suitable means. In FIG. 2 this end 12 of cord 9 is formed into loop 13 and band 14 crimped around the cord. The other end 15 of cord 9 is connected to hook means 10. Any suitable means of connection can be used. In FIG. 2 the connection means consists of looping the end 15 of cord 9 through an eye 17 in hook 10. A band 16 is crimped around the cord to secure the hook 10 in place. The hook 10 can be formed in any suitable fashion so long as it may be connected to the end 15 of cord 9. In the preferred embodiment the hook is formed from coated wire or plastic so that it dosen't rust. Similarly the weight 8 can be formed of any material that will provide sufficient weight. Lead as noted previously is commonly used in prior art devices. However due to the potential environmental hazard that can be caused by lead, other materials are preferred. If a ferrous metal is used it should preferably be coated or otherwise treated to eliminate rusting.

The end 18 of the hole 11 adjacent the hook 10 is preferably enlarged so that the loop in the end 15 of cord 9 will slide up into weight 8. The decoy weight is of a size and shape compatible with the size and type of decoy to provide the required stability to the decoy. The end 12 of cord 9 is as noted above connected to cord 5 which is attached to the stabilizing fin 3 at hole 6.

When the decoy is on the water the decoy weight hangs down into the water. Elastized cord 9 will stretch due to the resistance of weight 8 if there are waves on the surface of the water, giving the decoy a more life like action.

Figure 4:
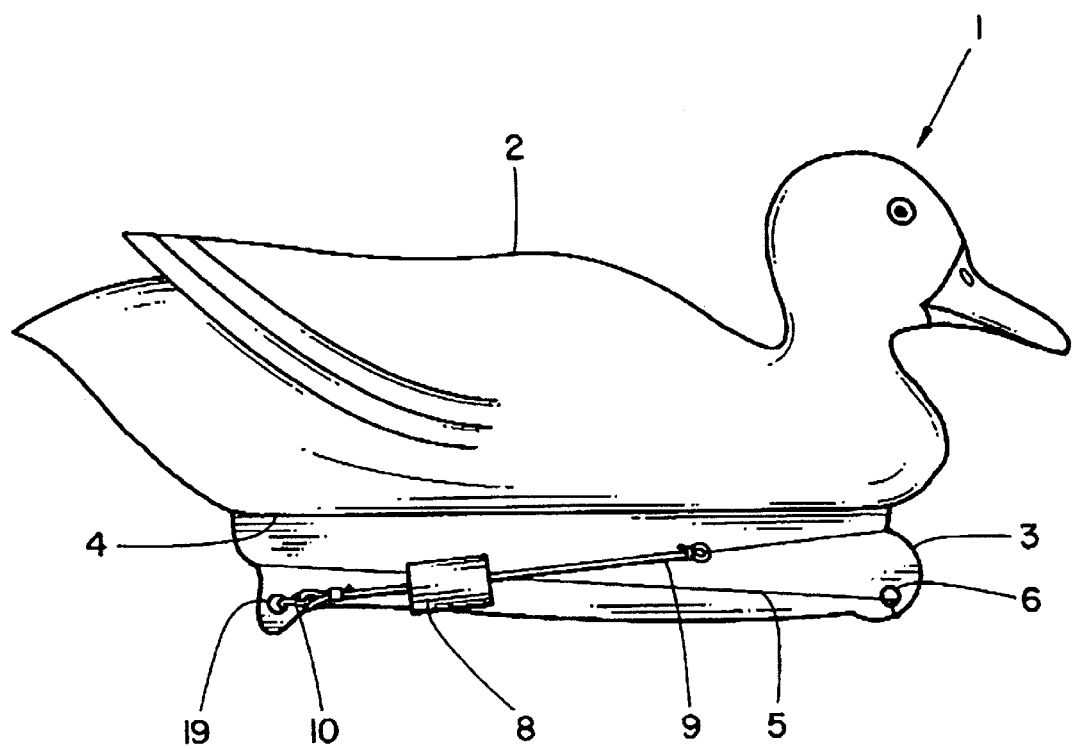
FIG. 4 illustrates a decoy of FIG. 1 with the decoy weight of the present invention in the transport position.

To transport or store, as shown in FIG. 4, the decoy string 5 is wrapped around stabilizing fin 3. Cord 9 is stretched until hook 10 can be inserted in hole 19 at the back of the stabilizing fin 3. Because the cord 9 is elastized the decoy weight assembly can be held in place under tension so the weight 8 doesn't come loose, rattle and/or chip the paint from the decoy.

To make the decoy weight of the present invention take a piece of elasticized cord preferably about 10" in length. Form a loop in one end. In the embodiment shown the end 12 of the cord is folded over about ½" and held in place by a metal band 14 crimped around the cord 9 to form a loop 13. Other methods of forming a loop may be suitable such as being tied in place with tie wire and then crimp. Next take a weight and drill a hole 11 along its longitudinal axis. In the preferred embodiment a 2" piece of metal rod 8 is utilized and painted with rust inhibiting paint. Alternatively the weight could be molded. The elasticized cord 9 is slid through the hole 11 in the decoy weight 8. The end 15 of the cord 9 is then connected to a hook means 10. Any suitable means may be used for connecting the cord to the hook. In the embodiment illustrated the end 15 of the cord is passed through an eye 17 on the hook 10 and a metal band 16 crimped around the cord 9 to finish the assembly. The end 18 of the hole 11 in the weight 8 adjacent the hook 10 is enlarged to permit the end 15 of the cord 9 and possibly the hook 10 to slide up into the weight. The loop 13 in the other end 12 of the elastized cord 9 can then be connected to the string 5 attached to the bottom of the decoy.

It will be appreciated that the above description related to the preferred embodiment by way of example only. Many variations on the invention will be obvious to those knowledgeable in the field, and such obvious variations are within the scope of the invention as described and claimed, whether or not expressly described.

What is claimed as the invention is:

1. A decoy and a decoy weight assembly for attachment to a decoy having a stabilizing fin having a front and rear end, said decoy weight assembly comprising a short elasticized cord having hook means attached to one end of said cord and the other end of said cord attached to a long string attached to the front end of the stabilizing fin of the decoy and a cylindrical weight having a hole centrally disposed through its longitudinal axis through which said elasticized cord is passed to slidably retain the weight on said cord, wherein said hook means is adapted, when the string is wrapped around the stabilizing fin of the decoy for transport or storage, to be inserted in a hole at the back of the stabilizing fin so that the decoy weight assembly is held in place under tension so the weight doesn't come loose, rattle or chip paint from an decoy wherein the end of the hole through the weight adjacent the hook means is enlarged so that the weight will slide over at least part of said hook means.

2. A decoy weight assembly according to claim 1 wherein said elasticized cord is about 10 inches long.

\* \* \* \* \*